US012151928B2

(12) United States Patent
Pierce

(10) Patent No.: US 12,151,928 B2
(45) Date of Patent: Nov. 26, 2024

(54) LIQUID TRANSFER APPARATUS

(71) Applicant: Jason Pierce, Tooele, UT (US)

(72) Inventor: Jason Pierce, Tooele, UT (US)

( * ) Notice: Subject to any disclaimer, the term of this patent is extended or adjusted under 35 U.S.C. 154(b) by 107 days.

(21) Appl. No.: 18/083,941

(22) Filed: Dec. 19, 2022

(65) Prior Publication Data

US 2023/0124263 A1 Apr. 20, 2023

Related U.S. Application Data

(63) Continuation-in-part of application No. 16/823,668, filed on Mar. 19, 2020, now abandoned.

(51) Int. Cl.

| | |
|---|---|
| ***B67D 7/60*** | (2010.01) |
| ***B67D 7/00*** | (2010.01) |
| ***F04F 10/00*** | (2006.01) |
| *F04B 9/14* | (2006.01) |

(52) U.S. Cl.

CPC ............... *B67D 7/60* (2013.01); *B67D 7/007* (2013.01); *F04F 10/00* (2013.01); *F04B 9/14* (2013.01)

(58) Field of Classification Search

CPC ... F04B 19/04; F04B 9/14; B67D 7/60; B67D 7/007; F04F 10/00

See application file for complete search history.

(56) References Cited

U.S. PATENT DOCUMENTS

| | | | |
|---|---|---|---|
| 6,068,163 A | 5/2000 | Kihm | |
| 6,305,357 B1 | 10/2001 | Soukeras | |
| D497,313 S | 10/2004 | Glover | |
| 7,163,034 B2 | 1/2007 | Franks | |
| 7,293,587 B1 | 11/2007 | Broberg | |
| 8,337,466 B2 * | 12/2012 | Salgia ................. | A61M 5/1424 604/181 |
| 2009/0066177 A1 | 3/2009 | Loke | |
| 2013/0168420 A1 | 7/2013 | Kern | |
| 2014/0230958 A1 | 8/2014 | Bonner | |
| 2017/0167458 A1 * | 6/2017 | Dietenberger ......... | F02M 59/42 |

OTHER PUBLICATIONS

Inertial Pump Operating Principles, URL: https://web.archive.org/web/20170711173323/https://www.solinst.com/products/groundwater-samplers/404-inertial-pump/datasheet/ (Year: 2017).*

* cited by examiner

*Primary Examiner* — Thomas Fink

(57) ABSTRACT

A liquid transfer assembly includes a housing that has a supply port, a return port and a fill port each extending into an interior of the housing. A shut off valve is movably integrated into the housing and the shut off valve is movable between a first condition and a second condition. A trigger is movably integrated into the grip and the trigger is in communication with the shut off valve. The shut off valve is actuated into the second condition when the trigger is depressed. An inertial pump is movably disposed within the housing and the inertial pump is charged with a handle to pump a fluid in a first container into the second container when the trigger is depressed. A priming pump is integrated into the housing for priming the inertial pump when the priming pump is manipulated.

10 Claims, 7 Drawing Sheets

LIQUID TRANSFER APPARATUS

CROSS-REFERENCE TO RELATED APPLICATIONS

I hereby claim the benefit under 35 U.S.C., Section 120 of U.S. application Ser. No. 16/823,668 filed Mar. 19, 2020.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to transfer devices and more particularly pertains to a new transfer device for pumping fluid from a first container into a second container. The device includes an inertial pump positioned in a housing and charging handle for charging the inertial pump. The device includes a trigger for facilitating the inertial pump to pump a fluid from a first container into a second container. Additionally, the device includes a priming pump for priming the inertial pump.

(2) Description of Related Art Including Information Disclosed Under 37 CFR 1.97 and 1.98

The prior art relates to transfer devices including a portable dispensing apparatus that includes a fuel chamber that is pressurized with a hand operated air pump. The prior art discloses a portable fluid transfer that includes a rotary vane pump that is driven by a hand crank and which is attachable to a fluid container and an output hose attached to the rotary vane pump. The prior art discloses a portable fluid transfer pump that includes a rotary vane pump that is driven with a hand crank, an intake hose insertable into a first container and an exhaust hose insertable into a second container. The prior art discloses a fuel transfer pump that includes a cart, a fuel tank positioned on the cart and a hand operated air pump for pressurizing the fuel tank and a refueling hose attached to the fuel tank.

BRIEF SUMMARY OF THE INVENTION

An embodiment of the disclosure meets the needs presented above by generally comprising a housing that has a supply port, a return port and a fill port each extending into an interior of the housing. A shut off valve is movably integrated into the housing and the shut off valve is movable between a first condition and a second condition. A trigger is movably integrated into the grip and the trigger is in communication with the shut off valve. The shut off valve is actuated into the second condition when the trigger is depressed. An inertial pump is movably disposed within the housing and the inertial pump is charged with a handle to pump a fluid in a first container into the second container when the trigger is depressed. A priming pump is integrated into the housing for priming the inertial pump when the priming pump is manipulated.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
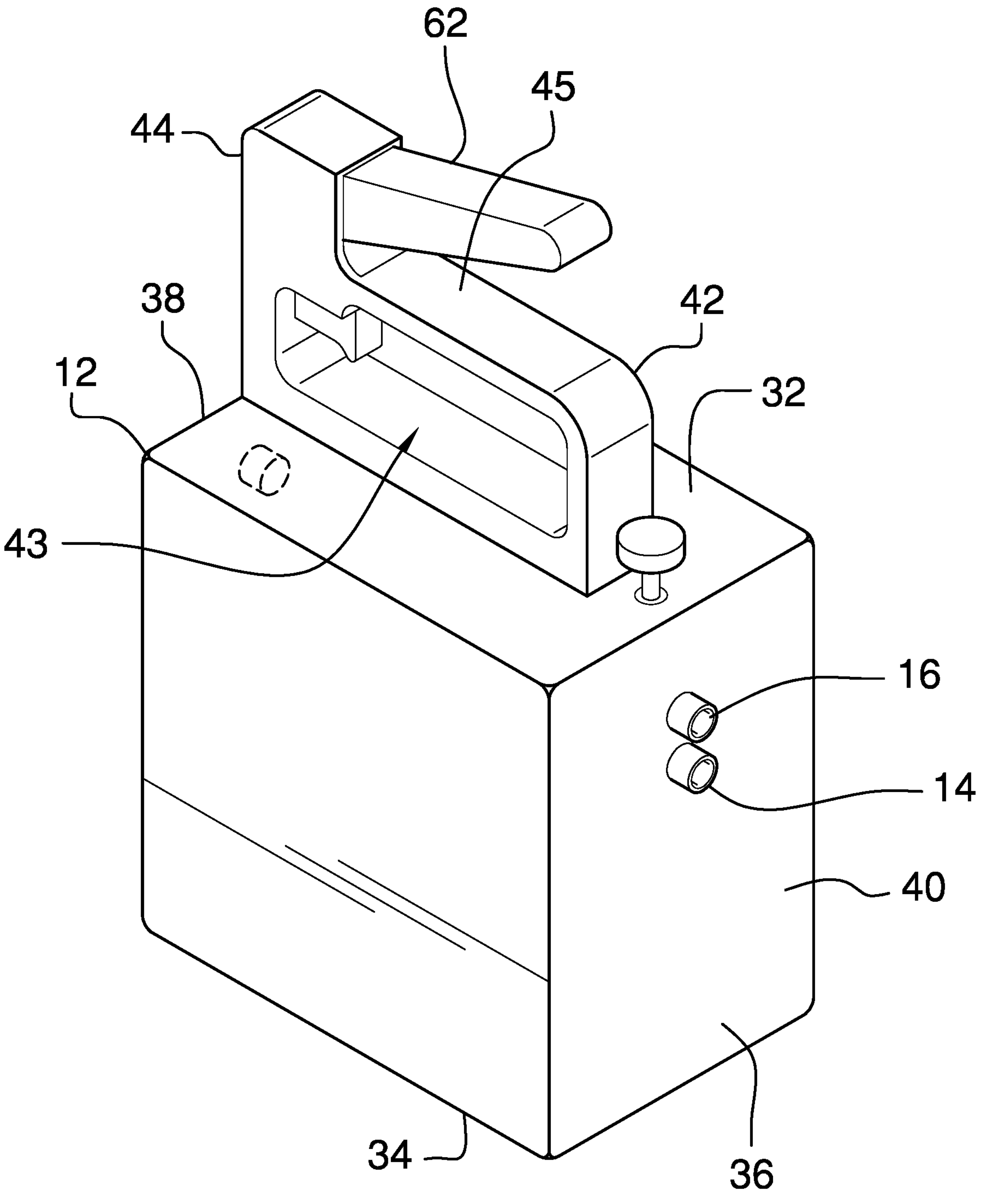
FIG. 1 is a back perspective view an embodiment of the disclosure.
Figure 2:
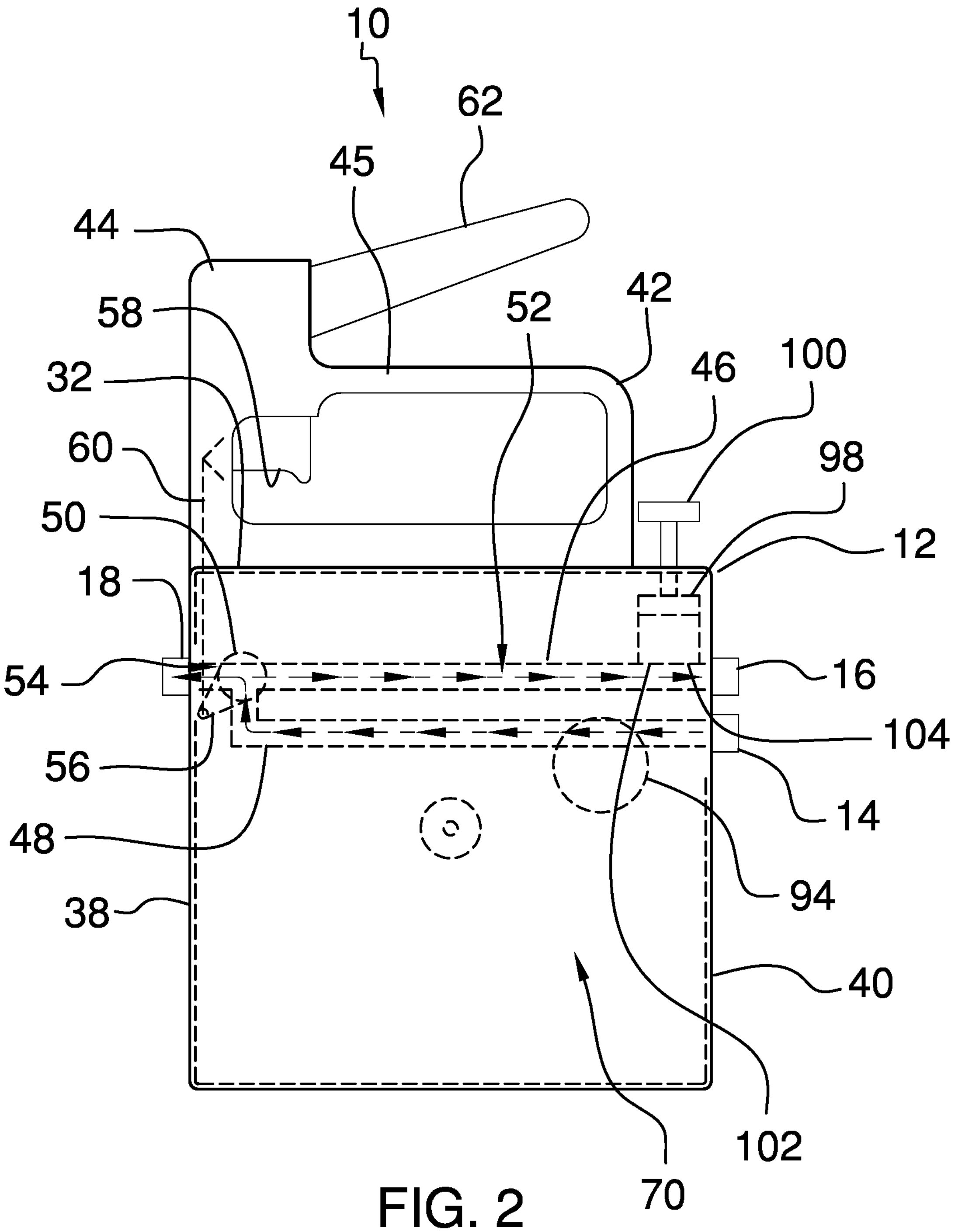
FIG. 2 is a left side phantom view of a liquid transfer assembly according to an embodiment of the disclosure showing a first conduit and a second conduit.
Figure 3:
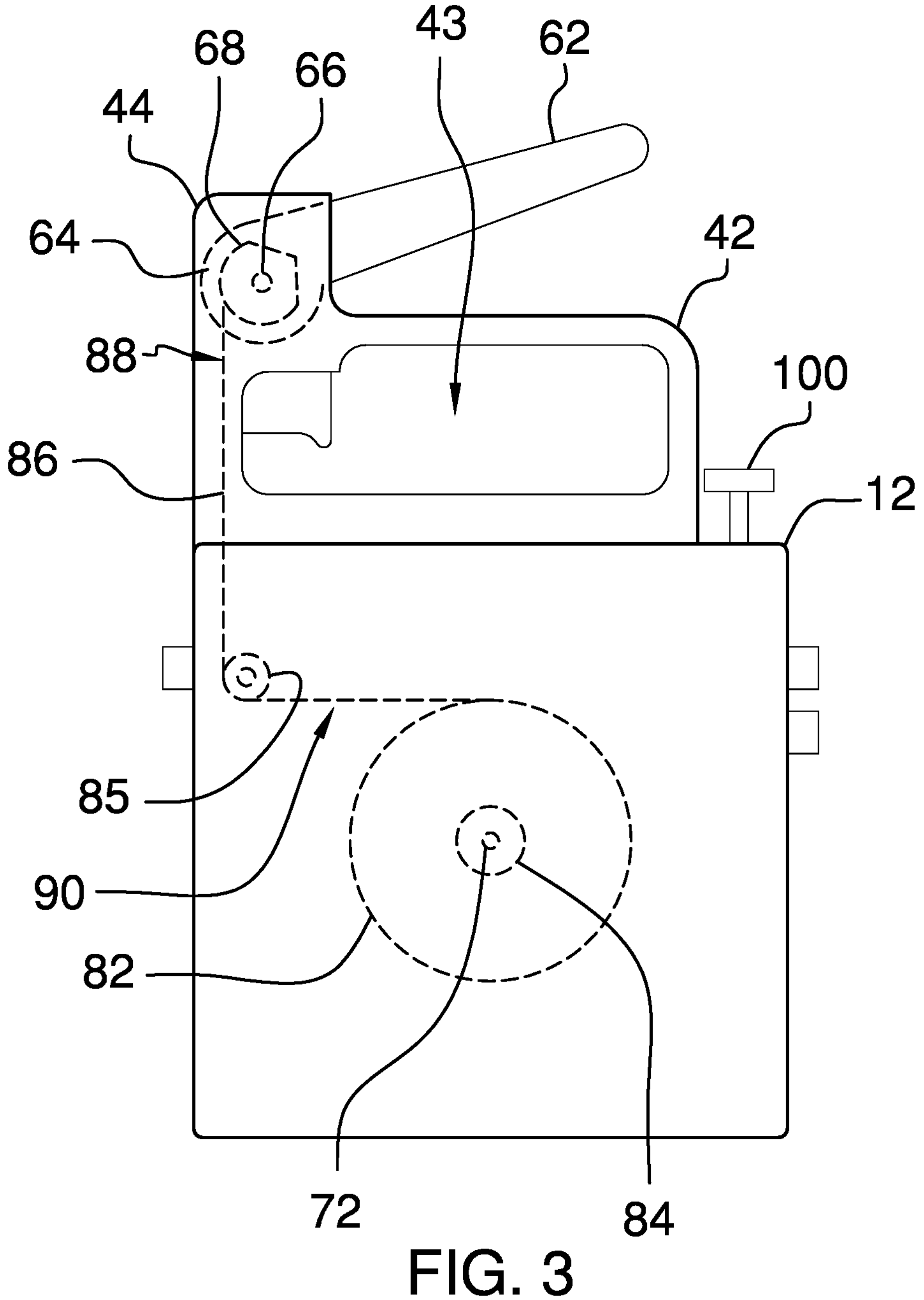
FIG. 3 is a left side phantom view of an embodiment of the disclosure showing a drive wheel, a handle pulley and a drive cable.
Figure 4:
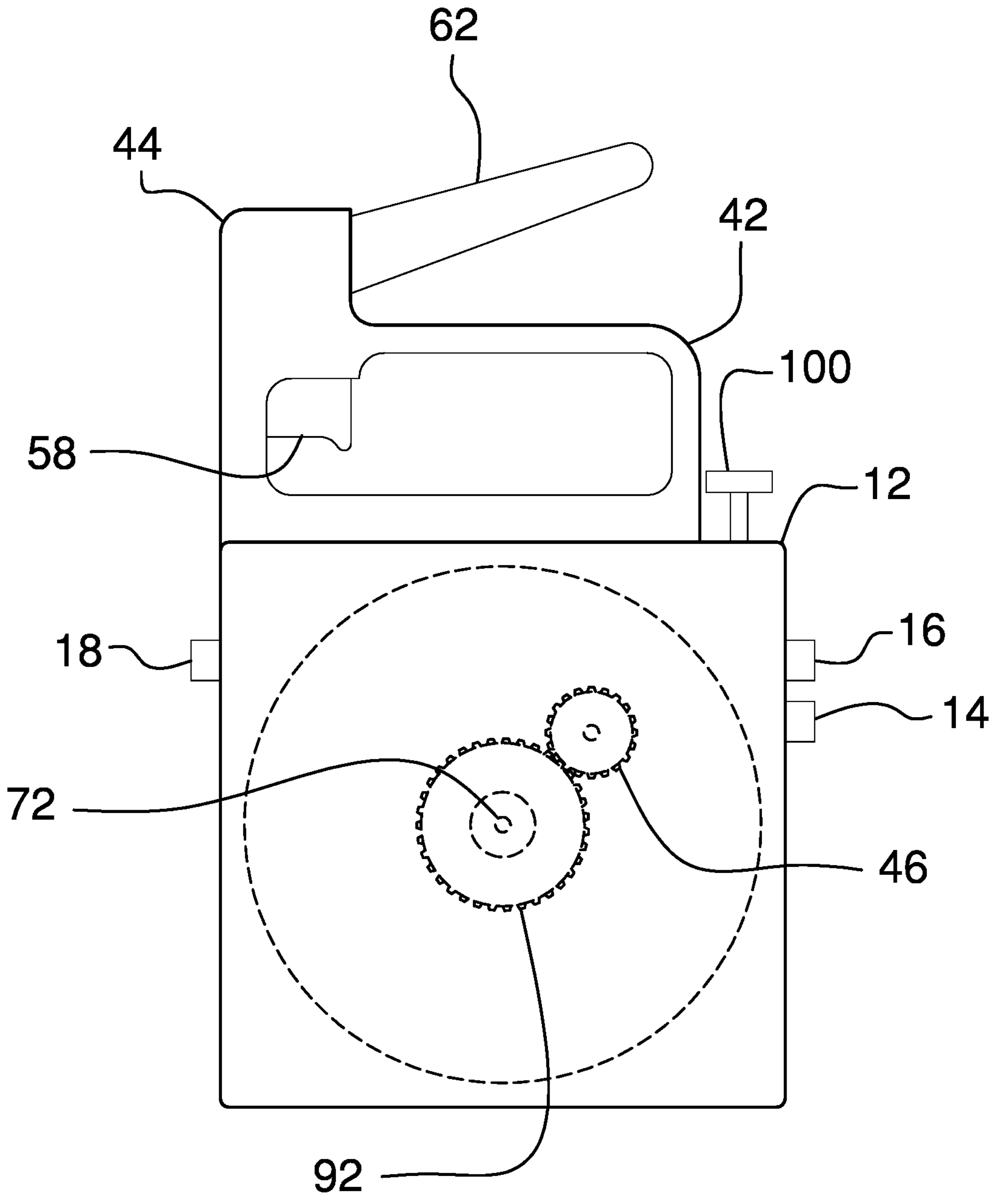
FIG. 4 is a left side phantom view of an embodiment of the disclosure showing a disk, a primary gear and a secondary gear.
Figure 5:
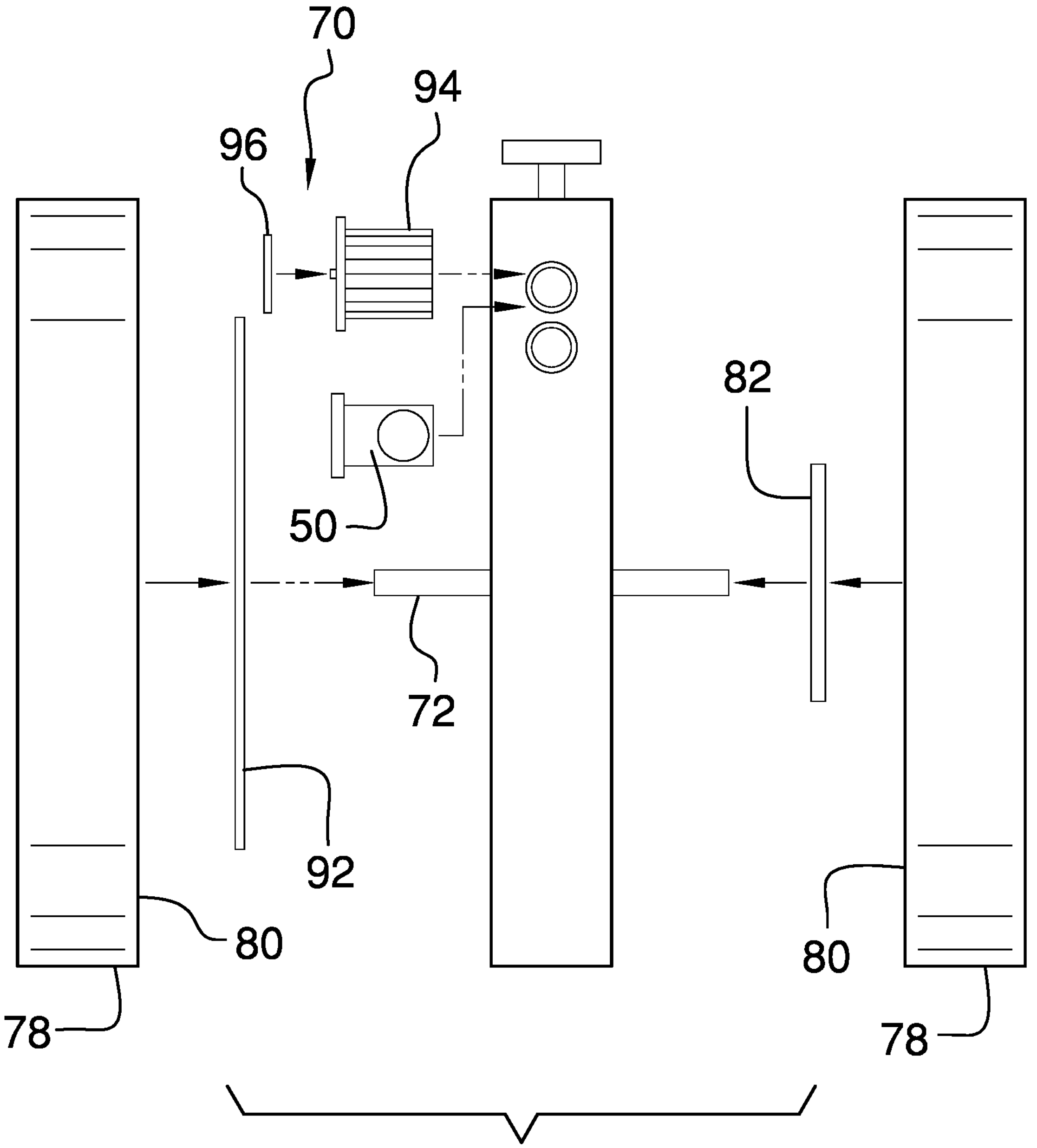
FIG. 5 is a front exploded view of an embodiment of the disclosure.
Figure 6:
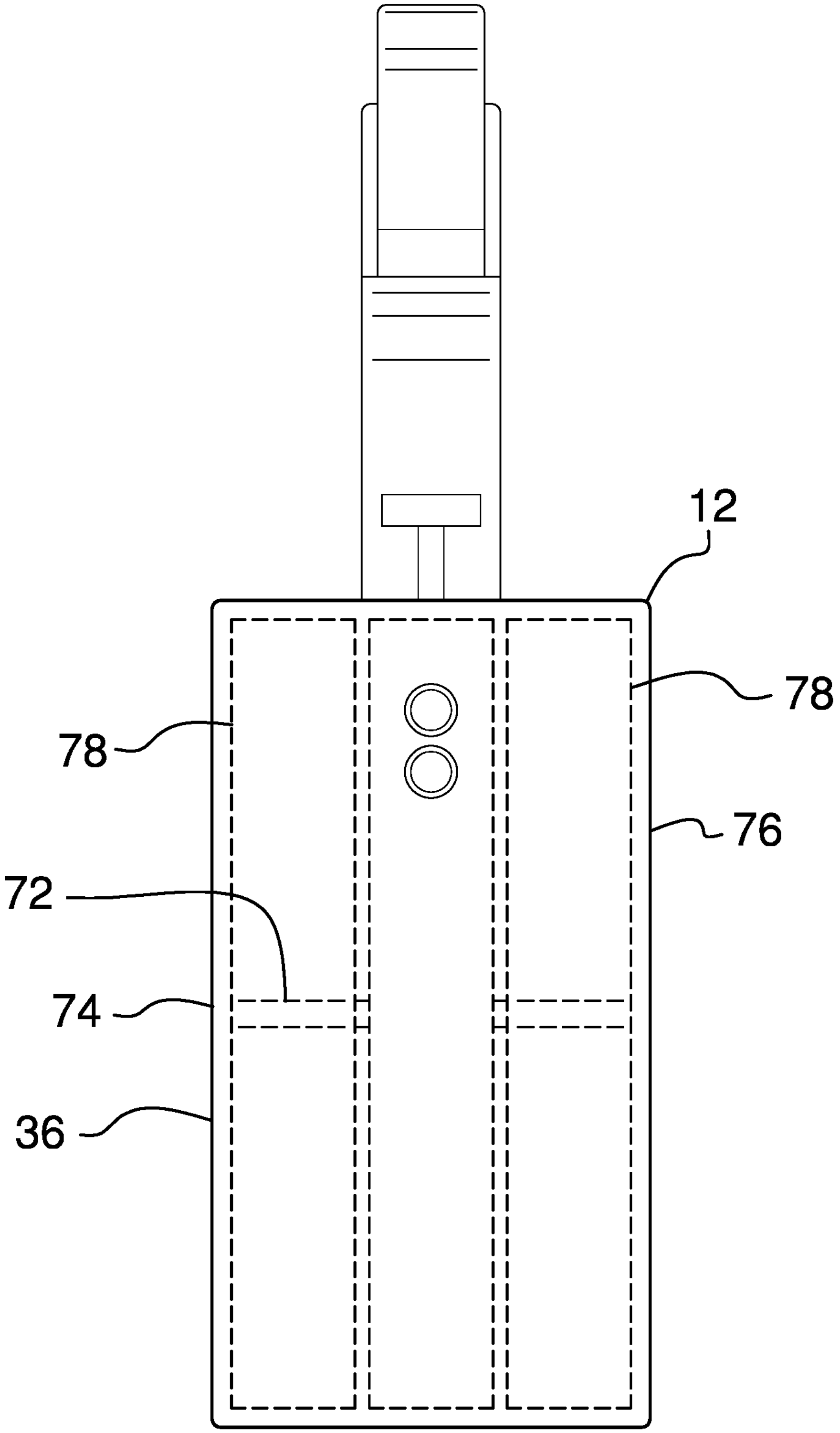
FIG. 6 is a front phantom view of an embodiment of the disclosure.
Figure 7:
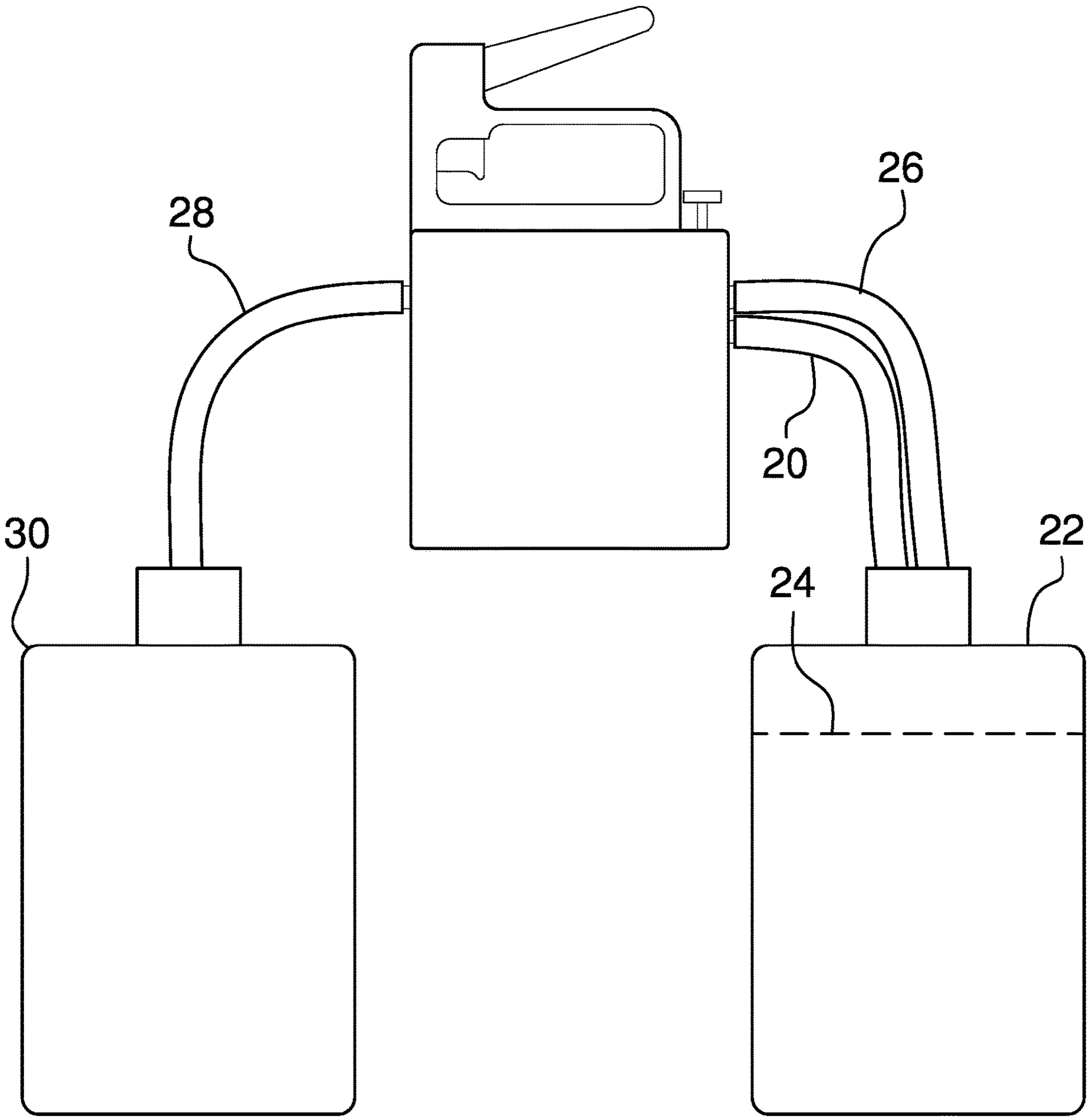
FIG. 7 is a perspective in-use view of an embodiment of the disclosure.

With reference now to the drawings, and in particular to FIGS. 1 through 7 thereof, a new transfer device embodying the principles and concepts of an embodiment of the disclosure and generally designated by the reference numeral 10 will be described.

As best illustrated in FIGS. 1 through 7, the liquid transfer assembly 10 generally comprises a housing 12 that has a supply port 14, a return port 16 and a fill port 18 each extending into an interior of the housing 12. The supply port 14 is fluidly attachable to a first hose 20 that extends into a first container 22 which contains a fluid 24. The first container 22 may be a fuel can, a bucket or any type of fluid container. Additionally, the fluid 24 may be fuel, water, lubricant or any other type of fluid 24 that might be contained in a fluid container. The return port 16 is fluidly attachable to a second hose 26 that extends into the first container 22 and the fill port 18 is fluidly attachable to a third hose 28 that extends into a second container 30 which is empty. The second container 30 may be a fuel can, a bucket or any other type of fluid container.

The housing 12 has a top wall 32, a bottom wall 34 and an outside wall 36 extending between the top wall 32 and the bottom wall 34 and the outside wall 36 has a front side 38 and a back side 40. Each of the return port 16 and the supply port 14 is disposed on the back side 40 and the fill port 18 is disposed on the front side 38. The housing 12 has a grip 42 extending upwardly from the top wall 32. The grip 42 has an opening 43 extending laterally through the grip 42 and a mount tower 44 extending upwardly from a top 45 of the grip 42. Additionally, the mount tower 44 is aligned with the front side 38 of the outside wall 36 of the housing 12. A first conduit 46 is fluidly coupled between the return port 16 and the fill port 18 and a second conduit 48 is fluidly coupled to the supply port 14. The second conduit 48 intersects the first conduit 46 at a point located adjacent to the fill port 18.

A shut off valve 50 is movably integrated into the housing 12 and the shut off valve 50 is in fluid communication between the supply port 14, the return port 16 and the fill port 18. The shut off valve 50 is actuatable into a first condition defining a first fluid circuit 52 between the return port 16 and the supply port 14. Conversely, the shut off valve 50 is actuatable into a second condition defining a second fluid circuit 54 between the supply port 14 and the fill port 18. The shut off valve 50 is biased into the first condition and the shut off valve 50 is located at the intersection between the first conduit 46 and the second conduit 48. Furthermore, the shut off valve 50 includes a lever 56 for urging the shut off valve 50 between the first condition and the second condition. The shut off valve 50 may comprise a two way fluid valve of any conventional design.

A trigger 58 is movably integrated into the grip 42 and the trigger 58 is in communication with the shut off valve 50. The shut off valve 50 is actuated into the second condition when the trigger 58 is depressed. Conversely, the shut off valve 50 is biased into the first condition when the trigger 58 is not depressed. The trigger 58 is positioned in the opening 43 in the grip 42 at a point that is aligned with the mount tower 44 on the grip 42. A trigger cable 60 is coupled between the trigger 58 and the lever 56 on the shut off valve 50 thereby facilitating the lever 56 to be pivoted when the trigger 58 is depressed.

A handle 62 is provided and the handle 62 is pivotally disposed on the housing 12. The handle 62 is urgeable into an engaged position and the handle 62 is biased into a disengaged position. The handle 62 has a coupled end 64 and the handle 62 has a pivot point 66 that is pivotally attached to the mount tower 44 on the grip 42. The pivot point 66 is positioned proximate the coupled end 64 such that the handle 62 is spaced from and is oriented to angle upwardly from the top of the grip 42. Furthermore, the handle 62 has a handle pulley 68 that is aligned with the coupled end 64 and the handle pulley 68 rotates about the pivot point 66.

An inertial pump 70 is movably disposed within the housing 12 and the inertial pump 70 is in fluid communication with the supply port 14. In this way the inertial pump 70 is in fluid communication with the first container 22 when the first hose 20 is fluidly coupled between the supply port 14 and the first container 22. The inertial pump 70 is in communication with the handle 62 and the inertial pump 70 is charged when the handle 62 is urged into the engaged position to urge the fluid 24 in the first container 22 inwardly through the supply port 14. Furthermore, the inertial pump 70 urges the fluid 24 outwardly through the return port 16 when the shut off valve 50 is in the first condition. The inertial pump 70 urges the fluid 24 outwardly through the fill port 18 when the shut off valve 50 is in the second condition thereby facilitating the fluid 24 in the first container 22 to be transferred into the second container 30.

The inertial pump 70 comprises a primary shaft 72 that is rotatably disposed between a first lateral side 74 and a second lateral side 76 of the outside wall 36 of the housing 12. The inertial pump 70 includes a pair of disks 78 that each has a first side 80 and the first side 80 of each of the disks 78 is attached to the primary shaft 72 such that the primary shaft 72 is perpendicularly oriented with the first side 80. Each of the disks 78 is rotated about the primary shaft 72 when the primary shaft 72 is rotated thereby facilitating each of the disks 78 to store rotational energy of the primary shaft 72. Each of the disks 78 is comprised of a dense and rigid material, including but not being limited to steel or brass, thereby facilitating the disks 78 to generate sufficient momentum for storing rotational energy in the convention of a flywheel.

The inertial pump 70 includes a drive wheel 82 that is positioned around the primary shaft 72 such that the drive wheel 82 rotates the primary shaft 72 when the drive wheel 82 is rotated. The drive wheel 82 is positioned adjacent to the first side 80 of a respective one of the disks 78. The drive wheel 82 includes a clutch 84 which facilitates the drive wheel 82 to engage the primary shaft 72 when the drive wheel 82 is exposed to rotational torque. Furthermore, the clutch 84 facilitates the drive wheel 82 to disengage the primary shaft 72 when the drive wheel 82 is not exposed to rotational torque.

The inertial pump 70 includes a drive pulley 85 that is rotatably disposed within the housing 12. The inertial pump 70 includes a drive cable 86 attached between the handle pulley 68 integrated into the handle 62 and the drive wheel 82. The drive cable 86 extends around the drive pulley 85 thereby defining a first portion 88 of the drive cable 86 extending between the drive pulley 85. Furthermore, the handle pulley 68 is perpendicularly oriented with a second portion 90 of the drive cable 86 which extends between the drive pulley 85 and the drive wheel 82. The drive cable 86 is wrapped around the handle pulley 68 when the handle 62 is urged into the engaged position such that the drive cable 86 imparts rotational torque into the drive wheel 82. In this way the pair of disks 78 can be rotated by the primary shaft 72 for converting the rotational torque into the rotational energy stored in the disks 78.

The inertial pump 70 includes a primary gear 92 that is positioned around the primary shaft 72 such that the primary shaft 72 rotates the primary gear 92. The primary gear 92 is positioned adjacent to the first side 80 of an opposing one of the pair of disks 78 with respect to the drive wheel 82. The inertial pump 70 includes a pump 94 that is integrated into the second conduit 48 in the housing 12. The pump 94 is positioned closer to the supply port 14 than the intersection between the second conduit 48 and the first conduit 46 and the pump 94 urges the fluid 24 inwardly through the supply port 14 when the pump 94 is actuated. The pump 94 urges the fluid 24 along the first fluid circuit 52 when the shut off valve 50 is in the first condition such that the fluid 24 re-circulates in the first container 22. The pump 94 urges the fluid 24 along the second fluid circuit 54 when the shut off valve 50 is in the second condition such that the fluid 24 transfers from the first container 22 to the second container

30. The pump 94 may comprise a impeller fluid pump or other similar type of mechanical fluid pump.

The inertial pump 70 includes a secondary gear 96 that is attached to the pump 94. The secondary gear 96 enmeshes with the primary gear 92 such that the secondary gear 96 is rotated when the primary gear 92 is rotated for driving the pump 94. In this way the disks 78 can continuously drive the pump 94 when the disks 78 are rotated. Additionally, the primary gear 92 has a greater diameter than the secondary gear 96 thereby increasing the rotational speed supplied to the pump 94.

A priming pump 98 is integrated into the housing 12 and the primary pump 94 is in communication with the supply port 14. The primary pump 94 urges the fluid 24 inwardly through the supply port 14 for priming the inertial pump 70 when the priming pump 98 is manipulated and when the shut off valve 50 is biased into the first condition. The priming pump 98 is fluidly attached to the first conduit 46 in the housing 12 and the priming pump 98 includes a pumping handle 100 extending upwardly through the top wall 32 of the housing 12 for manipulating the priming pump 98. The priming pump 98 urges the fluid 24 along the first fluid circuit 52 when the shut off valve 50 is in the first condition thereby facilitating the fluid 24 to prime the pump 94 associated with the inertial pump 70. The priming pump 98 has an input 102 that is directed toward the supply port 14 and an output 104 that is directed toward the return port 16. Furthermore, the priming pump 98 comprises a suction type fluid pump such that the priming pump 98 suctionally urges the fluid 24 into the supply port 14 to prime the pump 94 associated with the inertial pump 70.

In use, the first hose 20 and the second hose 26 are inserted into the first container 22 and the third hose 28 is inserted into the second container 30. The handle 62 is repeatedly urged into the engaging position to rotate the pair of disks 78 to a sufficient velocity that the disks 78 will continue to rotate for an extended duration of time. The pumping handle 100 is urged upwardly and downwardly to prime the pump 94 associated with the inertial pump 70 to facilitate the inertial pump 70 to begin pumping the fluid 24 inwardly through the supply port 14 and outwardly through the return port 16. The trigger 58 is depressed to actuate the shut off valve 50 into the second condition thereby facilitating the inertial pump 70 to pump the fluid 24 inwardly through the supply port 14 and outwardly through the fill port 18. In this way the fluid 24 can be transferred from the first container 22 into the second container 30. Furthermore, the inertial pump 70 facilitates the fluid 24 to be pumped in any location without the use of electricity. In this way fuel from a gas can, for example, could be pumped into the fuel tank of a motorized vehicle that is being operated in a remote location.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A liquid transfer assembly comprising:

a housing having a supply port and a return port and a fill port each extending into an interior of said housing, said supply port being fluidly attachable to a first hose extending into a first container which contains a fluid, said return port being fluidly attachable to a second hose extending into said first container, said fill port being fluidly attachable to a third hose extending into a second container which is empty;

a shut off valve being movably integrated into said housing, said shut off valve being in fluid communication between said supply port and said return port and said fill port, said shut off valve being actuatable into a first condition defining a first fluid circuit between said return port and said supply port, said shut off valve being actuatable into a second condition defining a second fluid circuit between said supply port and said fill port, said shut off valve being biased into said first condition;

a trigger being movably integrated into a grip, said trigger being in communication with said shut off valve, said shut off valve being actuated into said second condition when said trigger is depressed, said shut off valve being biased into said first condition when said trigger is not depressed;

a handle being pivotally disposed on said housing, said handle being urgeable into an engaged position, said handle being biased into a disengaged position;

an inertial pump being movably disposed within said housing, said inertial pump being in fluid communication with said supply port thereby facilitating said inertial pump to be in fluid communication with the first container when said first hose is fluidly coupled between said supply port and said first container, said inertial pump being in communication with said handle, said inertial pump being charged when said handle is urged into said engaged position thereby facilitating said inertial pump to urge the fluid in said first container inwardly through said supply port, said inertial pump urging the fluid outwardly through said return port when said shut off valve is in said first condition, said inertial pump urging the fluid outwardly through said fill port when said shut off valve is in said second condition thereby facilitating the fluid in said first container to be transferred into said second container; and a priming pump being integrated into said housing, said primary pump being in communication with said supply port, said primary pump urging the fluid inwardly through said supply port for priming said inertial pump when said priming pump is manipulated and when said shut off valve is biased into said first condition.

2. The assembly according to claim 1, wherein:

said housing has a top wall, a bottom wall and an outside wall extending between said top wall and said bottom wall, said outside wall having a front side and a back side, each of said return port and said supply port being disposed on said back side, said fill port being disposed on said front side, said housing having said grip extending upwardly from said top wall, said grip having an opening extending laterally through said grip and a mount tower extending upwardly from a top of said grip, said mount tower being aligned with said front side of said outside wall of said housing;

a first conduit being fluidly coupled between said return port and said fill port;

a second conduit being fluidly coupled to said supply port, said second conduit intersecting said first conduit at a point located adjacent to said fill port; and said shut off valve is located at said intersection between said first conduit and said second conduit, said shut off valve including a lever for urging said shut off valve between said first condition and said second condition.

3. The assembly according to claim 2, wherein:

said trigger is positioned in said opening in said grip at a point being aligned with said mount tower on said grip; and said assembly includes a trigger cable being coupled between said trigger and a lever on said shut off valve thereby facilitating said lever to be pivoted when said trigger is depressed.

4. The assembly according to claim 2, wherein said handle has a coupled end, said handle having a pivot point being pivotally attached to said mount tower on said grip, said pivot point being positioned proximate said coupled end such that said handle is spaced from and is oriented to angle upwardly from said top of said grip, said handle having a handle pulley being aligned with said coupled end, said handle pulley rotating about said pivot point.

5. The assembly according to claim 2, wherein said inertial pump comprises:

a primary shaft being rotatably disposed between a first lateral side and a second lateral side of said outside wall of said housing; and a pair of disks, each of said disks having a first side, said first side of each of said disks being attached to said primary shaft such that said primary shaft is perpendicularly oriented with said first side, each of said disks being rotated about said primary shaft when said primary shaft is rotated thereby facilitating each of said disks to store rotational energy of said primary shaft.

6. The assembly according to claim 5, wherein said inertial pump includes a drive wheel being positioned around said primary shaft such that said drive wheel rotates said primary shaft when said drive wheel is rotated, said drive wheel being positioned adjacent to said first surface of a respective one of said disks, said drive wheel including a clutch facilitating said drive wheel to engage said primary shaft when said drive wheel is exposed to rotational torque, said clutch facilitating said drive wheel to disengage said primary shaft when said drive wheel is not exposed to rotational torque.

7. The assembly according to claim 6, wherein said inertial pump includes:

a drive pulley being rotatably disposed within said housing; and a drive cable being attached between said handle pulley integrated into said handle and said drive wheel, said drive cable extending around said drive pulley thereby defining a first portion of said drive cable extending between said drive pulley and said handle pulley being perpendicularly oriented with a second portion of said drive cable extending between said drive pulley and said drive wheel, said drive cable being wrapped around said handle pulley when said handle is urged into said engaged position such that said drive cable imparts rotational torque into said drive wheel thereby facilitating said pair of disks to be rotated by said primary shaft for converting the rotational torque into the rotational energy stored in said disks.

8. The assembly according to claim 6, wherein said inertial pump includes:

a primary gear being positioned around said primary shaft such that said primary shaft rotates said primary gear, said primary gear being positioned adjacent to said first surface of an opposing one of said pair of disks with respect to said drive wheel;

a pump being integrated into said second conduit in said housing, said pump being positioned closer to said supply port than said intersection between said second conduit and said first conduit, said pump urging the fluid inwardly through said supply port when said pump is actuated, said pump urging the fluid along said first fluid circuit when said shut off valve is in said first condition such that the fluid re-circulates in said first container, said pump urging the fluid along said second fluid circuit when said shut off valve is in said second condition such that the fluid transfers from said first container to said second container; and a secondary gear being attached to said pump, said secondary gear enmeshing with said primary gear such that said secondary gear is rotated when said primary gear is rotated for driving said pump thereby facilitating said disks to continuously drive said pump when said disks are rotated.

9. The assembly according to claim 8, wherein said priming pump is fluidly attached to said first conduit in said housing, said priming pump including a pumping handle extending upwardly through said top wall of said housing for manipulating said priming pump, said priming pump urging the fluid along said first fluid circuit when said shut off valve is in said first condition thereby facilitating the fluid to prime said pump associated with said inertial pump.

10. A liquid transfer assembly comprising:

a housing having a supply port and a return port and a fill port each extending into an interior of said housing, said supply port being fluidly attachable to a first hose extending into a first container which contains a fluid, said return port being fluidly attachable to a second hose extending into said first container, said fill port being fluidly attachable to a third hose extending into a second container which is empty, said housing having a top wall, a bottom wall and an outside wall extending between said top wall and said bottom wall, said outside wall having a front side and a back side, each of said return port and said supply port being disposed on said back side, said fill port being disposed on said front side, said housing having a grip extending upwardly from said top wall, said grip having an opening extending laterally through said grip and a mount tower extending upwardly from a top of said grip, said mount tower being aligned with said front side of said outside wall of said housing;

a first conduit being fluidly coupled between said return port and said fill port;

a second conduit being fluidly coupled to said supply port, said second conduit intersecting said first conduit at a point located adjacent to said fill port;

a shut off valve being movably integrated into said housing, said shut off valve being in fluid communication between said supply port and said return port and said fill port, said shut off valve being actuatable into a first condition defining a first fluid circuit between said return port and said supply port, said shut off valve being actuatable into a second condition defining a second fluid circuit between said supply port and said fill port, said shut off valve being biased into said first condition, said shut off valve being located at said intersection between said first conduit and said second conduit, said shut off valve including a lever for urging said shut off valve between said first condition and said second condition;

a trigger being movably integrated into said grip, said trigger being in communication with said shut off valve, said shut off valve being actuated into said second condition when said trigger is depressed, said shut off valve being biased into said first condition when said trigger is not depressed, said trigger being positioned in said opening in said grip at a point being aligned with said mount tower on said grip;

a trigger cable being coupled between said trigger and a lever on said shut off valve thereby facilitating said lever to be pivoted when said trigger is depressed;

a handle being pivotally disposed on said housing, said handle being urgeable into an engaged position, said handle being biased into a disengaged position, said handle having a coupled end, said handle having a pivot point being pivotally attached to said mount tower on said grip, said pivot point being positioned proximate said coupled end such that said handle is spaced from and is oriented to angle upwardly from said top of said grip, said handle having a handle pulley being aligned with said coupled end, said handle pulley rotating about said pivot point;

an inertial pump being movably disposed within said housing, said inertial pump being in fluid communication with said supply port thereby facilitating said inertial pump to be in fluid communication with the first container when said first hose is fluidly coupled between said supply port and said first container, said inertial pump being in communication with said handle, said inertial pump being charged when said handle is urged into said engaged position thereby facilitating said inertial pump to urge the fluid in said first container inwardly through said supply port, said inertial pump urging the fluid outwardly through said return port when said shut off valve is in said first condition, said inertial pump urging the fluid outwardly through said fill port when said shut off valve is in said second condition thereby facilitating the fluid in said first container to be transferred into said second container, said inertial pump comprising:

a primary shaft being rotatably disposed between a first lateral side and a second lateral side of said outside wall of said housing;

a pair of disks, each of said disks having a first side, said first side of each of said disks being attached to said primary shaft such that said primary shaft is perpendicularly oriented with said first side, each of said disks being rotated about said primary shaft when said primary shaft is rotated thereby facilitating each of said disks to store rotational energy of said primary shaft;

a drive wheel being positioned around said primary shaft such that said drive wheel rotates said primary shaft when said drive wheel is rotated, said drive wheel being positioned adjacent to said first surface of a respective one of said disks, said drive wheel including a clutch facilitating said drive wheel to engage said primary shaft when said drive wheel is exposed to rotational torque, said clutch facilitating said drive wheel to disengage said primary shaft when said drive wheel is not exposed to rotational torque;

a drive pulley being rotatably disposed within said housing;

a drive cable being attached between said handle pulley integrated into said handle and said drive wheel, said drive cable extending around said drive pulley thereby defining a first portion of said drive cable extending between said drive pulley and said handle pulley being perpendicularly oriented with a second portion of said drive cable extending between said drive pulley and said drive wheel, said drive cable being wrapped around said handle pulley when said handle is urged into said engaged position such that said drive cable imparts rotational torque into said drive wheel thereby facilitating said pair of disks to be rotated by said primary shaft for converting the rotational torque into the rotational energy stored in said disks;

a primary gear being positioned around said primary shaft such that said primary shaft rotates said primary gear, said primary gear being positioned adjacent to said first surface of an opposing one of said pair of disks with respect to said drive wheel;

a pump being integrated into said second conduit in said housing, said pump being positioned closer to said supply port than said intersection between said second conduit and said first conduit, said pump urging the fluid inwardly through said supply port when said pump is actuated, said pump urging the fluid along said first fluid circuit when said shut off valve is in said first condition such that the fluid re-circulates in said first container, said pump urging the fluid along said second fluid circuit when said shut off valve is in said second condition such that the fluid transfers from said first container to said second container; and a secondary gear being attached to said pump, said secondary gear enmeshing with said primary gear such that said secondary gear is rotated when said primary gear is rotated for driving said pump thereby facilitating said disks to continuously drive said pump when said disks are rotated; and a priming pump being integrated into said housing, said primary pump being in communication with said supply port, said primary pump urging the fluid inwardly through said supply port for priming said inertial pump when said priming pump is manipulated and when said shut off valve is biased into said first condition, said priming pump being fluidly attached to said first conduit in said housing, said priming pump including a pumping handle extending upwardly through said top wall of said housing for manipulating said priming pump, said priming pump urging the fluid along said first fluid circuit when said shut off valve is in said first condition thereby facilitating the fluid to prime said pump associated with said inertial pump.

* * * * *